United States Patent [19]

Everts

[11] Patent Number: 4,901,682

[45] Date of Patent: Feb. 20, 1990

[54] REED VALVE FOR TWO CYCLE INTERNAL COMBUSTION ENGINES

[75] Inventor: Robert G. Everts, Chandler, Ariz.

[73] Assignee: Piston Powered Products, Inc., Chandler, Ariz.

[21] Appl. No.: 251,897

[22] Filed: Sep. 30, 1988

[51] Int. Cl.$^4$ .................... F16K 15/14; F02B 33/30
[52] U.S. Cl. ............................ 123/73 V; 137/856
[58] Field of Search ............ 123/73 V, 52 M, 52 MC, 123/52 MB; 137/856

[56] References Cited

U.S. PATENT DOCUMENTS

| | | | |
|---|---|---|---|
| 4,082,295 | 4/1978 | Bainard | 137/856 |
| 4,083,184 | 4/1978 | Ushijima et al. | 137/856 |
| 4,257,458 | 3/1981 | Kondo et al. | 137/856 |
| 4,599,978 | 7/1986 | Kamata et al. | 123/73 V |
| 4,739,732 | 4/1988 | Nakamura | 123/73 V |
| 4,779,580 | 10/1988 | Rutschmann | 123/52 MF |

FOREIGN PATENT DOCUMENTS

| | | | |
|---|---|---|---|
| 0076372 | 5/1982 | Japan | 137/856 |
| 0116028 | 6/1986 | Japan | 123/52 M |

Primary Examiner—David A. Okonsky
Attorney, Agent, or Firm—Donald D. Mon

[57] ABSTRACT

A reed valve for a two cycle internal combustion engine. The engine has a metal crankcase to which the valve body of the reed valve is mounted. The valve body is made of an insulating material. A flat metal seat plate is fixed to the valve body. The seat plate has a flat seat not liable to be distorted by heat. A metal reed plate is fixed to the seat plate with its free end overhanging the flat seat. The seat on the seat plate is less liable to be distorted by heat than would be a similar seat formed as part of an insulating valve body.

6 Claims, 1 Drawing Sheet

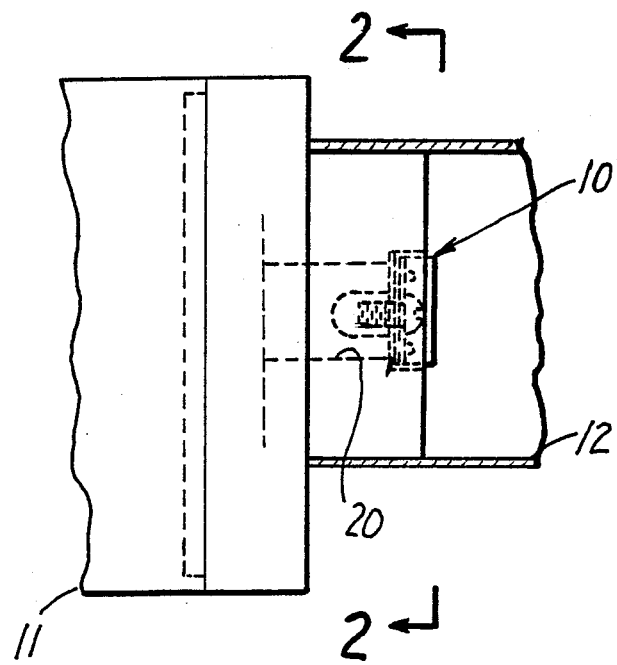
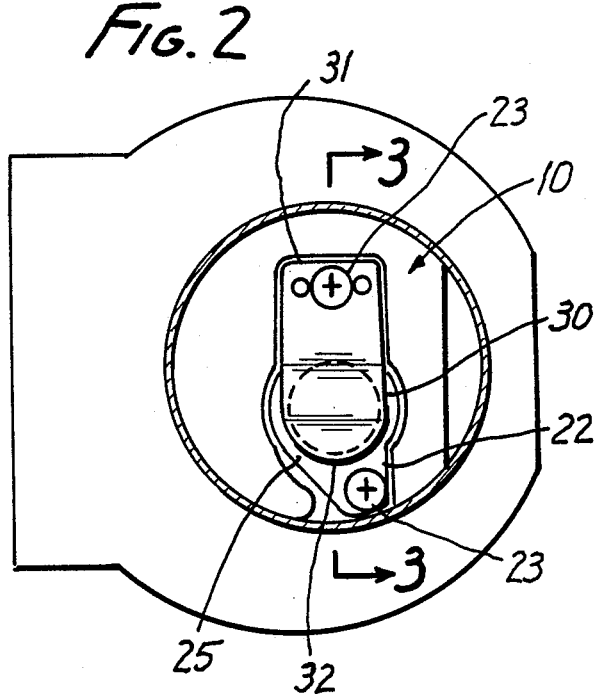
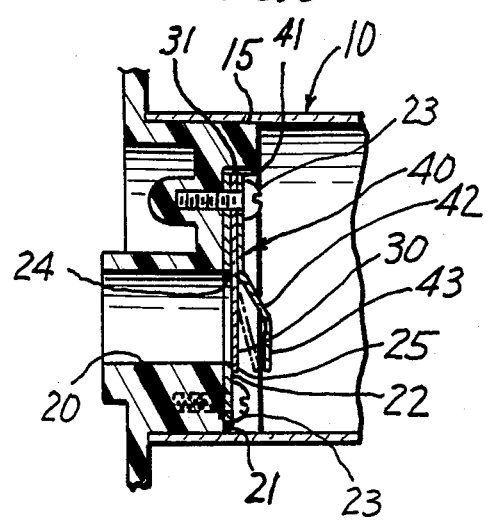

REED VALVE FOR TWO CYCLE INTERNAL COMBUSTION ENGINES

FIELD OF THE INVENTION

This invention relates to two-cycle internal combustion engines, and in particular to an improved reed valve disposed between the carburetor and the crankcase.

BACKGROUND OF THE INVENTION

In one type of conventional two-cycle internal combustion engine, a reed valve is positioned in the path of flow of the fuel/air charge between the carburetor and the crankcase. It acts as a one-way check valve, opening and closing to meet the downstream demands of the engine.

Such valves are well known and widely used. They do, however, have complications. For example, the engine crankcase where the valve is mounted gets hot in operation. If the entire valve is made of metal, it soon becomes so hot that the fuel gasifies and the engine often stalls out. To overcome this problem, the valve body is generally made of a heat-insulating material. A metal reed plate is mounted to the plastic body, and its free end seats against the plastic body when the valve is closed. This arrangement keeps the reed valve cool enough that it does not adversely affect the fuel/air charge.

As so often happens, a cure for one problem may create a problem of its own, and this has in fact occurred. The plastic valve body is an injection molded article. Because of the complicated shapes involved, the body has various thicknesses. When the body is molded, it is very difficult to maintain a flat surface in high volume production. Furthermore, when the body is heated, as happens in a running engine, stresses which have been molded into the part are relieved resulting in distortions of the plastic valve seat. Then an imperfect closing action sometimes results that adversely affects the engine operation.

It is an object of this invention to provide a reed valve with a thermally-insulating body and a valve seat that does not distort with rising temperatures.

BRIEF DESCRIPTION OF THE INVENTION

A reed valve according to this invention includes a body made of a thermally-insulating material. A flow passage extends therethrough, which is intended to interconnect the carburetor outlet and the engine crankcase. It is to be mounted to the crankcase.

A seat plate is fixed to the body of the reed valve. It has a port therethrough which is immediately surrounded by a flat peripheral seat on the surface of the seat plate. When heated the valve seat does not distort to form out-of plane configurations. Also, because of the plastic body, it tends to heat up less than if it were directly mounted to the metal chassis. A reed plate is fitted to the seat plate, with its free end overlaying the peripheral seat. When the valve is closed, the reed plate bears smoothly and continuously on the undistorted metal peripheral seat. Thus the advantages of a non-distorting seat are attained in a reed valve which also enjoys the thermal insulation advantages of a plastic body.

The above and other features of the invention will be fully understood from the following detailed description and the accompanying drawings, in which:

BRIEF DESCRIPTION OF THE DRAWINGS

FIG. 1 is a side view, partly in cutaway and partly in schematic notation;

FIG. 2 is cross-section taken at line 2—2 in FIG. 1; and

FIG. 3 is a cross-section taken at line 3—3 in FIG. 2.

DETAILED DESCRIPTION OF THE INVENTION

FIG. 1 shows a reed valve 10 according to this invention. It is schematically shown receiving a fuel/air charge from a carburetor 11, and discharging into the crankcase 12 of a two-cycle internal combustion engine. The details of the carburetor and of the engine are of no importance to this invention, and are therefore not described or shown in detail.

The crankcase is made of metal, which heats up when the engine is operated. The reed valve has a body 15 that is mounted to the crankcase wall. The body is preferably molded. It has a complicated shape dictated in part by the shape of the next assemblies, and in part by the demands of the molding process which makes it. Best molding practice attempts to minimize wide variations in cross section. While this is good molding practice, flat mold-formed surfaces formed by molding are likely to distort when the molded body is heated. Although it is an attained objective of using a thermally-insulating material for the body to keep the temperature low enough not to disturb the fuel/air charge, the rise in temperature can be enough to distort a plastic valve seat.

A passage 20, preferably circular, extends through the body and opens into a flat surface 21. A flat metal seat plate 22 is fixed to the body such as by threaded screws 23. It has a circular port 24 therethrough aligned with passage 20, and is the termination of passage 20.

A fully peripheral flat seat 25 is formed on the exposed side of the seat plate, extending around port 24.

A springy reed plate 30 is fixed to the body through the seat plate. It has a base end 31 that bears flush against the seat plate. It is inherently flexible, being attached only at the base end. Its free end 32 is inherently biased toward and against the seat plate, and especially toward and against the seat itself. Its free end is arcuately curved and its outer boundary in the relaxed condition is preferably concentric with port 24. The curved outer end then overlaps its respective half of the port 24 by only about 0.005 to 0.010 inches. A larger overlap could tend to impede the flow of charge unnecessarily. Its overlap at the other side of the port is obviously larger. The reed plate then makes a flat sealing fit against seat 25 when in its relaxed, closed, position shown in solid line in FIG. 3.

A backing plate 40 is also fixed to the body by one of fasteners 23. It is relatively rigid. It has a fixed base end 41, a curved transition section 42, and a limit stop section 43 at its free end. The transition section limits flexure of the reed plate to a smooth curve, and the limit stop prevents over-deflection. A partly opened valve condition is shown in dashed line in FIG. 3.

If desired, a gasket (not shown) can be fitted between the seat plate and surface 21, both to act as a seal between the body and the seat plate, and also to provide insulation for the metal seat plate. If used, it is to be construed as part of the valve body.

Of significance to this invention is that the reed plate can inherently assume a flat configuration to conform to the flat seat on the seat plate. The seat is unlikely to be distorted by heat, especially when the seat plate is flat.

The operation of the reed valve is conventional, and requires no further discussion for the purposes of this invention.

As to materials of construction, the body can be made of any organic plastic material which is resistant to fuels, oils and heat. Glass filled (reinforced) nylon is a useful example.

The seat plate may be made of any suitable metal. Because it does not have to flex, relatively inexpensive alloys are acceptable, for example, 1040 steel. A thickness of about 3/64 inches is sufficient.

The reed plate should be made of stainless steel treated to a condition which can withstand the many bending cycles which it will endure. It should be made as thin as possible so as not unduly to impede the flow of the charge. For a reed plate about 1⅛ inches in free length overlaying a port of about ⅜ inches in diameter, a thickness of about 0.005 inches of a suitable stainless steel is satisfactory.

The reed valve according to this invention makes a much improved seal and results in improved engine operation.

This invention is not to be limited by the embodiment shown in the drawings and described in the description, which is given by way of example and not of limitation, but only in accordance with the scope of the appended claims.

I claim:

1. A reed valve for incorporation in the flow path of a fuel/air charge from a carburetor to a metal crankcase of a two cycle internal combustion engine, said reed valve comprising:

a valve body adapted to be mounted to the crankcase, said valve body being made of a thermally-insulating organic plastic material, having a surface, and a passage extending through the body and opening into said surface;

a metal seat plate mounted to said surface having a port therethrough aligned with said passage, and having a fully peripheral flat seat extending around said port; and a metal reed plate having a fixed end and a free end, said fixed end being fixed to said seat plate, said free end being so proportioned and arranged as to bear against and fully seal against said flat seat when in its relaxed condition, and to flex away from said flat seat to open said valve when the differential pressure across it is sufficient, thereby to enable flow of the fuel/air charge in one direction, and to check against it in the other direction through said passage.

2. A reed valve according to claim 1 in which a backing plate overhangs said reed plate, so disposed and arranged as to limit the flexure of said reed plate.

3. A reed plate according to claim 1 in which said passage and flat seat are circular, and in which said free end of said reed plate is semi-circular, overlapping about one-half of said flat seat.

4. Apparatus according to claim 3 in which said reed plate is attached to said seat plate by fastener means.

5. Apparatus according to claim 4 in which both said reed plate and said seat plate are attached to said body by said fastener means.

6. Apparatus according to claim 1 in which the material of said body is glass reinforced nylon.

* * * * *